US005544860A

United States Patent [19]

Craig

[11] Patent Number: 5,544,860

[45] Date of Patent: Aug. 13, 1996

[54] HOIST AND POSITIONING APPARATUS

[75] Inventor: Richard L. Craig, Lisbon, Ohio

[73] Assignee: R. L. Craig, Inc., Lisbon, Ohio

[21] Appl. No.: 334,945

[22] Filed: Nov. 7, 1994

[51] Int. Cl.[6] ........ B60P 1/10

[52] U.S. Cl. ........ 254/7 R

[58] Field of Search ........ 254/2 B, 2 C, 254/7 B, 7 C, 98; 269/73, 251, 253; 187/226, 409, 410, 238

[56] References Cited

U.S. PATENT DOCUMENTS

| | | | |
|---|---|---|---|
| 665,758 | 1/1901 | Sayers . | |
| 1,891,899 | 12/1932 | Bushnell . | |
| 2,309,123 | 1/1943 | Kiesling . | |
| 2,740,607 | 4/1956 | Branick | 254/2 B |
| 2,742,257 | 4/1956 | Hott et al. | 254/7 B |
| 3,088,545 | 5/1963 | Meyer . | |
| 3,215,402 | 11/1965 | Hott et al. | 254/7 B |
| 3,391,905 | 7/1968 | Burns | 254/7 B |
| 4,593,883 | 6/1986 | Nelson . | |
| 4,637,496 | 1/1987 | Atkey et al. . | |
| 4,934,202 | 7/1990 | Hikita et al. | 269/73 |

*Primary Examiner*—Robert C. Watson

*Attorney, Agent, or Firm*—Sand & Sebolt

[57] ABSTRACT

A hoist apparatus for accurately positioning and supporting a load above a production line, which includes an elongated post having a pair of sides with arcuate guide channels formed thereon, and a front face having a recess formed therein. A carriage is supported on the elongated post and a drive screw engages the carriage such that rotation of the drive screw axially translates the carriage in a direction parallel to the longitudinal axis of the post. A base supports the elongated post and includes an interior cross section complementary-shaped to the exterior of the post's exterior surface. In the first embodiment, a plurality of casters are carried by the carriage and rotatably engage the guide channels. The casters are each rotatably mounted on an ececctric cam shaft such that rotation of the cam shaft axially translates the casters toward or away from the guide channel. Such rotation allows the casters to be accurately positioned relative to the guide channel. Further, the eccentric cam shafts may be further rotated to create an interference between the caster and the guide channel to lock the carriage at a predetermined elevation. In a second embodiment of the invention, friction guides engage the respective guide channel on the elongated post and are slidably received thereon. A locking friction guide is also provided on one side of the carriage to lock the carriage at a predetermined elevation.

27 Claims, 5 Drawing Sheets

HOIST AND POSITIONING APPARATUS

BACKGROUND OF THE INVENTION

1. Technical Field

The invention relates to a hoist and positioning apparatus. In particular, the invention relates to portable hoist and positioning apparatus adapted to support a load at various elevations. Specifically, the invention relates to such a portable hoist and positioning apparatus in which the load may be accurately positioned relative to a floor, and the load position may be locked to prevent the load's movement relative to the floor.

2. Background Information

Many industrial and manufacturing processes require that equipment or materials be positioned at various elevations relative to a floor or a production line.

It is often necessary for equipment to be accurately positioned relative to a production line, especially when automated manufacturing equipment is used on the production line. Moreover, it is also important that once the equipment is accurately positioned relative to the production line, that it remains so positioned without workers continually rechecking the equipment position. The accurate positioning of equipment relative to the production line is itself difficult, but given the continued movement and vibration indicative of a manufacturing setting, the continued accuracy of a preset position is also difficult to achieve.

Stationary supports are one method of achieving and maintaining accurate machine position. While stationary supports are presumably adequate for the purpose for which they are intended, these supports can be relatively costly, require significant floor space, and are not easily adjusted. Further, the need often exists for supports which not only provide elevational adjustment of the load, but the need also exists for a hoist and positioning apparatus which may be moved from location to location in an industrial or manufacturing setting.

Product labeling is one example of a manufacturing process which requires that equipment be accurately positioned relative to the product line. Products are generally labeled via a label applicator which must be accurately positioned relative to the product line to assure that the label is accurately applied to the product or product container. Moreover, the accurate positioning of the label applicator must be maintained to assure that through time, the labeling machine does not move up or down as in either situation, the label would not be correctly applied to the product.

Further, label applicators are often moved between various production lines, and positioned at various elevations with respect thereto for proper application of labels to products having a variety of sizes and configurations.

Various hoist apparatus and adjustable mounting stands are disclosed in the prior art, including U.S. Pat. Nos. 4,593,883 and 4,971,292. While the hoist apparatus included in the above-mentioned patents are presumably sufficient for the purpose for which they are intended, they do not provide a hoist apparatus which may be accurately positioned relative to the floor or production line, such that the accurate position may be maintained indefinitely without the need for workers to continually recheck the load position. Further, none of the prior art devices are easily adjusted from one elevation to another such that any chosen elevation may be accurately determined, and maintained.

Therefore, the need exists for a portable and adjustable hoist apparatus in which the load position is accurately determined and maintained relative to the production line. Moreover, the need exists for a portable and adjustable hoist apparatus wherein the load's elevation relative to the production line may be easily adjusted, and in which the portable and adjustable hoist apparatus itself may be moved from location to location while maintaining an accurate load position relative to a production line.

SUMMARY OF THE INVENTION

Objectives of the invention include providing a hoist apparatus which is both portable and adjustable.

Another objective of the invention is to provide such a hoist apparatus which supports a load at various elevations.

A further objective of the invention is to provide such a hoist apparatus which accurately positions and maintains a load at a chosen elevation.

Yet another objective of the present invention is to provide such a hoist apparatus where a carriage may be accurately adjusted on the post, even when both the carriage and post are manufactured with broad tolerance specifications.

A still further objective of the invention is to provide such a hoist apparatus which is sturdy, stable, durable in use, easy to maintain, and which will accurately position and maintain a load at a chosen elevation while still being manufactured with relatively broad tolerance specifications.

Yet another objective of the invention is to provide such a hoist apparatus which can be safely and effectively operated by a single person, and which significantly reduces the possibility of injury to the operator and accidental damage to the supported load and associated equipment.

A still further objective is to provide such a portable and adjustable hoist apparatus which is of simple construction, which achieves the stated objections in a simple, effective and inexpensive manner, and which solves problems and satisfies needs existing in the art.

These and other objectives and advantages of the improved invention are obtained by the hoist apparatus for supporting a load above the ground, the general nature of which may be stated as including an elongated post having a pair of sides with arcuate guide channels formed thereon and a front surface having a recessed formed thereon; base means for supporting the post in an upright position; a drive screw extending within said recess in said front surface; carriage means for supporting a load, which carriage means operatively communicates with said drive screws; follower means engaging each respective arcuate guide channel for movement therealong; said follower means being carried by said carriage means; and adjusting means for adjusting the follower means toward and away from a respective arcuate guide channel to remove any movement therebetween.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1A:
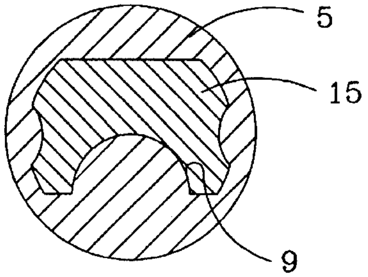
FIG. 1A is a sectional view taken substantially along line 1A—1A, FIG. 1.
Figure 1:
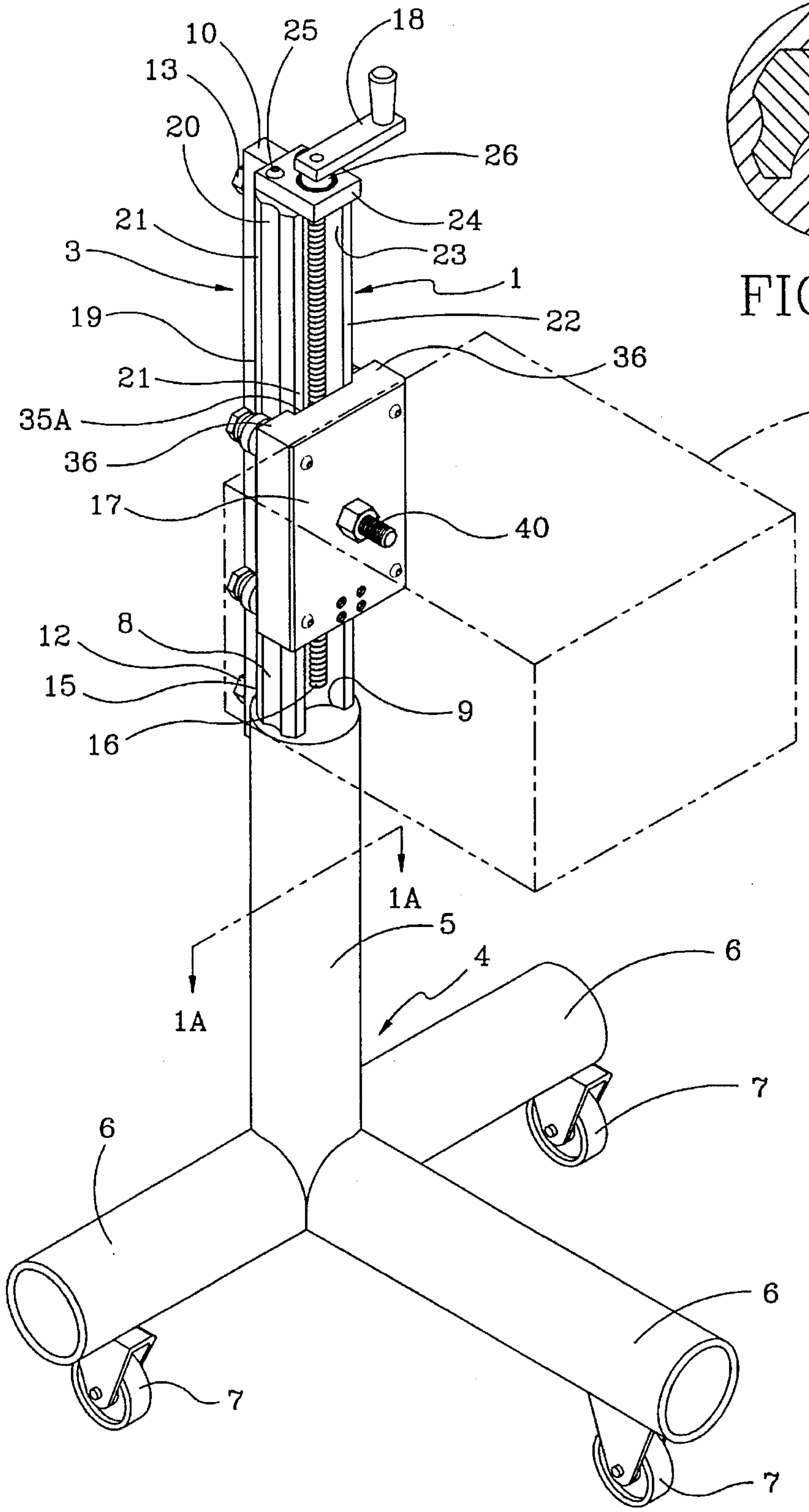
FIG. 1 is a perspective view of the improved hoist apparatus of the present invention shown and in combination with a load depicted in dot-dash lines.

The improved hoist apparatus of the present invention is indicated generally at 1, and is shown in FIG. 1 supporting a load 2 in an elevated position. Load 2 could be one of a variety of pieces of equipment used in and around an assembly line. Alternatively, load 2 could be a supply of materials for use on an assembly line, or to be acted on by automated machinery.

Hoist apparatus 1 includes a hoist 3 and a base 4. Base 4 includes a vertical support post 5 welded to one free end of each of three legs 6 which combine to form a T-shape. As should be apparent to one of ordinary skill in the art, support post 5, and legs 6 may be attached in a variety of ways, without departing from the spirit of the present invention, with welds being shown in the preferred embodiment. Further, base 4 is preferably formed of heavy gauge tubular steel for strength, stability and durability. A plurality of lockable wheels 7 are mounted on the ends of legs 6 for portability of hoist 1 between production lines in a manufacturing plant. Wheels 7 are sufficiently large to ensure easy mobility of hoist 1 over irregular surfaces common in both industrial and manufacturing settings.

Hoist 3 includes an elongated post 15, a drive screw 16, a carriage 17 and a hand crank or handle 18. A motor may also be added in place of hand crank 18 without departing from the spirit of the present invention. In the preferred embodiment, elongated post 15 is extruded and has an exterior surface 8 which includes a pair of parallel and spaced apart side surfaces 19. Each side surface 19 is formed with an arcuate concave guide channel 20, and an arcuate portion 21 on either side of each guide channel 20. Elongated post 15 also includes a front surface 22 formed with an arcuate concave recess 23 extending the length thereof. In the preferred embodiment, recess 23 houses drive screw 16 which extends substantially the length of recess 23.

In accordance with one of the main features of the present invention, post 5 has an interior surface 9 having a cross section complementary to the cross section of surface 8 of hoist 3. Base 4 may also include a strengthening rib 10 bolted to base 4 via a plurality of bolts 12. Strengthening rib 10 extends along substantially the entire length of elongated post 15, and is bolted thereto via a plurality of bolts 13. Strengthening rib 10 may be bolted to elongated post 15 when hoist apparatus 1 is supporting a particularly heavy load 2.

Figure 2:
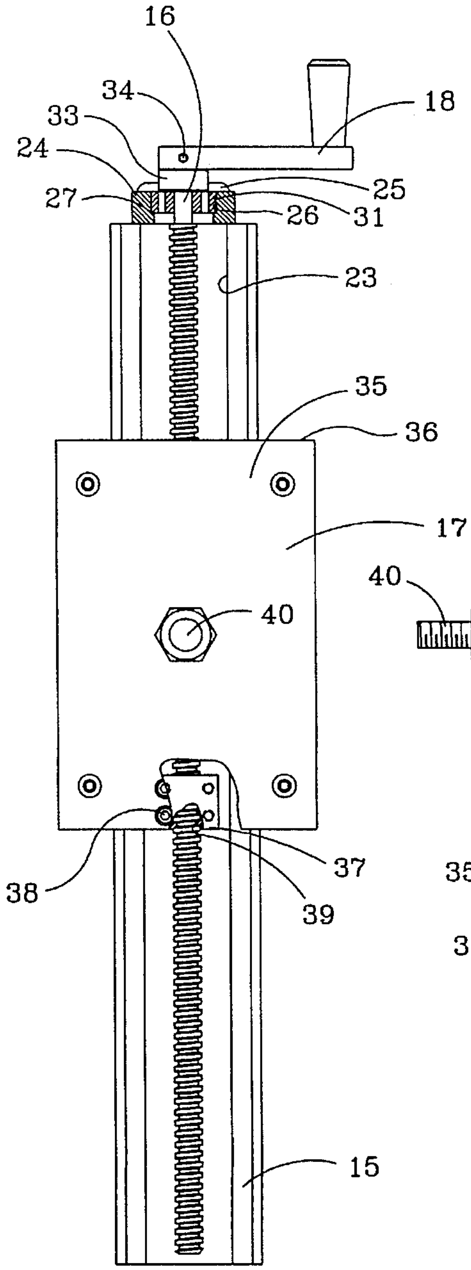
FIG. 2 is a front elevational view of the upper portion of the hoist apparatus of FIG. 1 with portions cut away and portions in section.

Referring to FIGS. 1–2, a cap plate 24 is secured to a top surface of elongated post 15 by any convenient attachment means with a plurality of hex nuts 25 being shown in the preferred embodiment. Cap plate 24 is formed with a through aperture 26 having a shoulder 27. A bearing set 31 rests on shoulder 27 and extends circumferentially around drive screw 16. A cap nut 33 is then fitted over drive screw 16. Bearing set 31 is thus interposed between shoulder 27 and cap nut 33 thereby suspending drive screw 16 from bearing set 31. Hand crank 18 is then secured to drive screw 16 via any convenient attachment means, with a set screw 34 being shown in the preferred embodiment.

Figure 3:
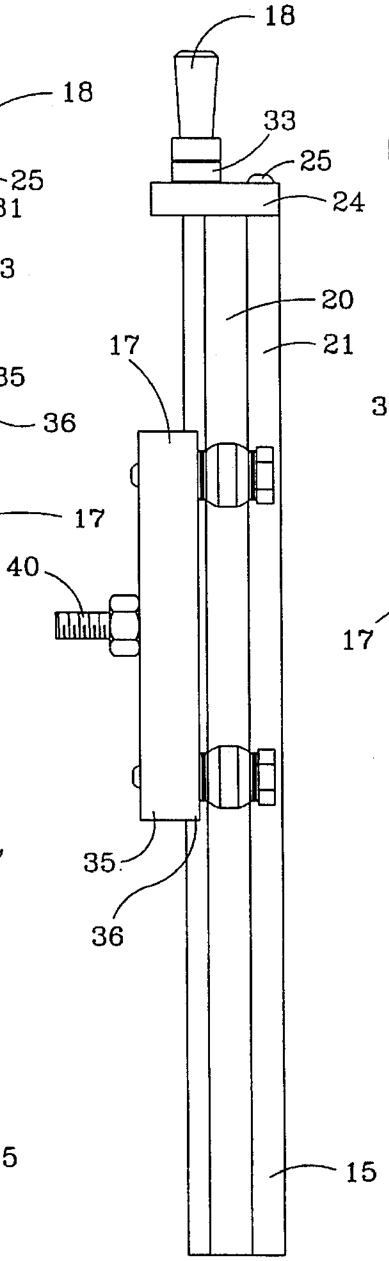
FIG. 3 is a side elevational view of FIG. 2.
Figure 4:
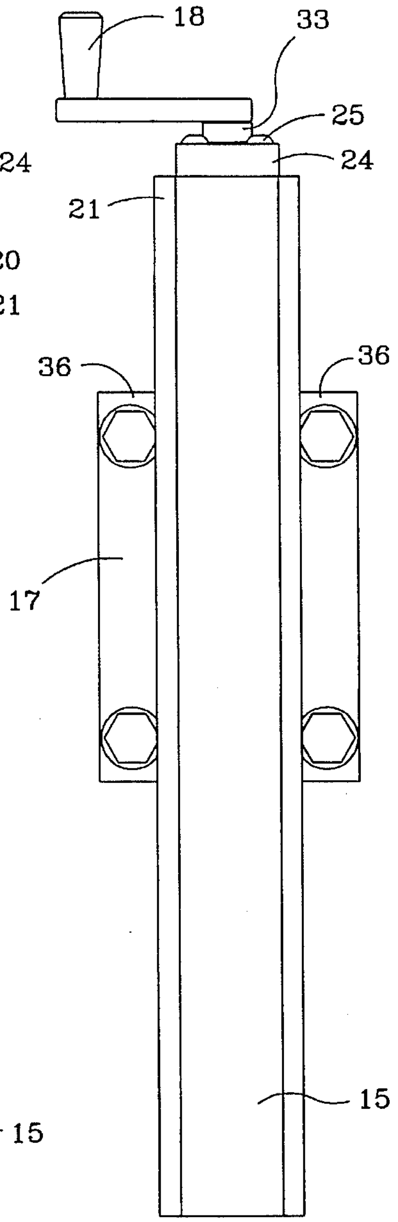
FIG. 4 is a rear elevational view of FIG. 2.

Referring to FIGS. 2–4, carriage 17 includes a carriage plate 35 which is wider than elongated post 15, and a pair of parallel and spaced apart elongated flanges 36 extending outwardly from a rear surface 35A of carriage plate 35. A mounting bolt 40 extends outwardly from the center of carriage plate 35 for mounting load 2 thereon. A drive nut 37 is attached to carriage 17 via any convenient attachment means, with hex bolts 38 being shown in the preferred embodiment. Drive nut 37 is formed with a threaded hole 39 which threadably engages drive screw 16 such that rotation of drive screw 16 will linearly translate drive nut 37 and associated carriage 17.

Figure 5:
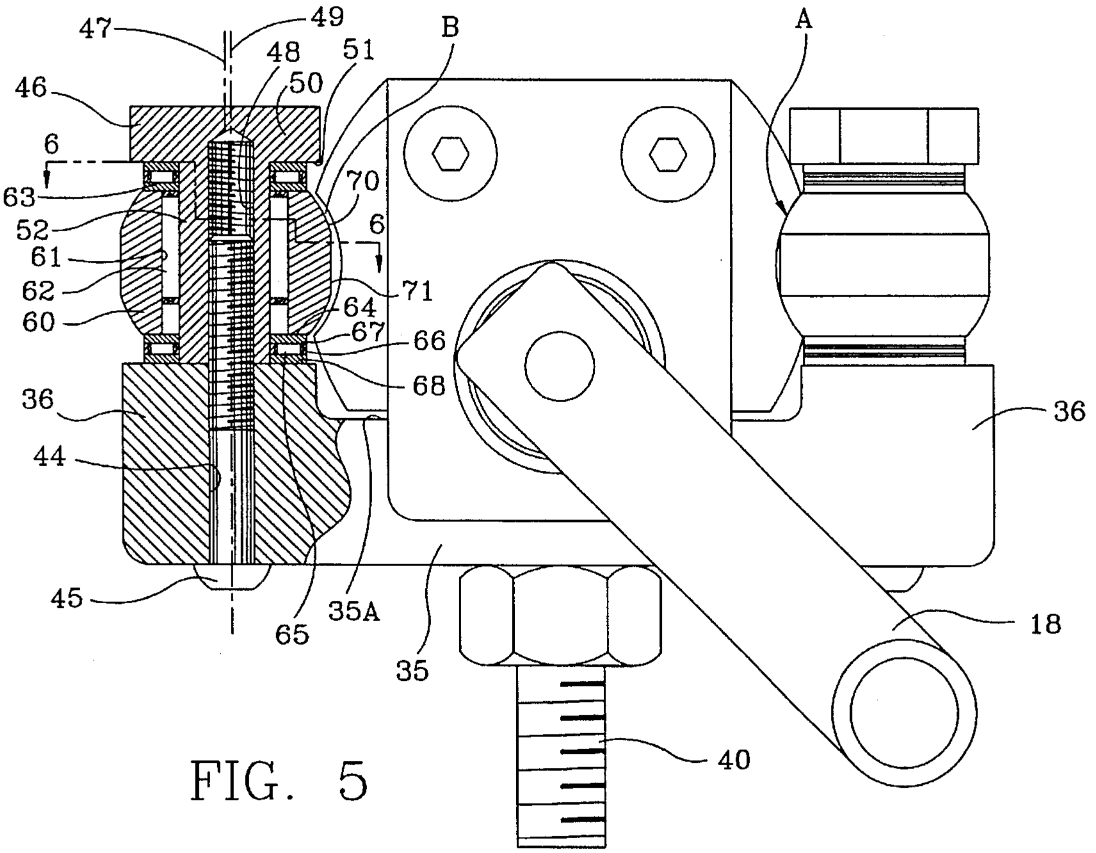
FIG. 5 is an enlarged top plan view of the upper portion of the hoist apparatus of FIG. 1, with portions cut away and in section.
Figure 6:
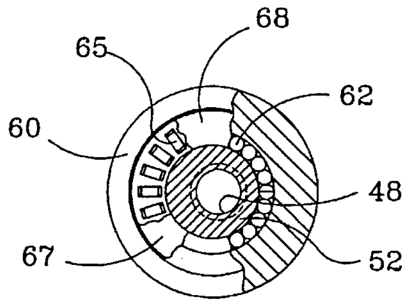
FIG. 6 is a sectional view taken substantially along line 6—6, FIG. 5, with portions cut away and in section.
Figure 7:
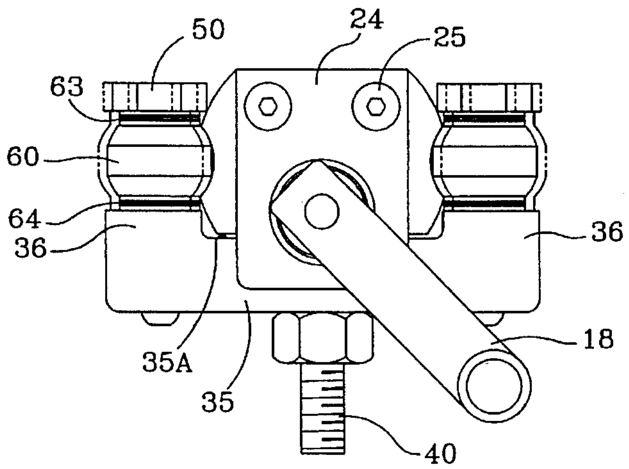
FIG. 7 is a top plan view of the upper portion of the hoist apparatus of FIG. 1, illustrating the range of lateral travel of each caster.

Referring specifically to FIGS. 5–7, a pair of holes 44 (one shown) extend through each flange 36 and carriage plate 35 for accepting a hex bolt or pin 45. A plurality of cam bolts 46, having an axial centerline 47, each has a threaded hole 48 extending partially therethrough. Each hole 48 has an axial centerline 49 and threadably engage one hex bolt 45. Axial centerlines 47 and 49 are parallel, but offset and as such, threaded hole 48 does not extend through the center of cam bolt 46. The offset location of threaded hole 48 thus creates a varying wall thickness in each cam bolt 46, as shown in FIG. 5.

Each cam bolt 46 includes an enlarged head 50 defining a shoulder 51, and a cam shaft 52. A follower or caster 60, having a through hole 61, is mounted on each cam shaft 52. A needle bearing set 62 is press fitted into each hole 61, which needle bearing set 62 has an inner diameter substantially equal to an outside diameter of cam shafts 52. Needle bearing set 62 provides rotational movement of caster 60 about cam shaft 52.

A first bearing set 63 is interposed between each shoulder 51 and each caster 60, and a second bearing set 64 is interposed between each flange 36 and each caster 60. Both first bearing set 63 and second bearing set 64 include a plurality of bearings 65 held within a bearing cage 66 and an inner race 67 and an outer race 68. First bearing set 63 provides rotational movement between caster 60 and shoulder 51, and second bearing set 64 provides rotational movement between caster 60 and respective flange 36. Bearing sets 63 and 64 are preferably thrust bearings and permit rotation of caster 60 about cam shaft 52 regardless of the pressure exerted on caster 60 via the threaded engagement of hex bolt 45 and threaded hole 48.

Caster 60 also includes spaced apart arcuate portions 70 which are complementary shaped to a portion of arcuate guide channel 20. Each caster 60 also includes a flattened portion 71 interposed between arcuate portions 70 which does not contact guide channel 20.

In operation and referring specifically to FIG. 1, a load 2 is first attached to bolt 40 on carriage 17. Hoist apparatus 1 may then be moved to a manufacturing line. Once positioned, the rotation of handle 18 will rotate drive screw 16 via the direct connection therebetween. The rotation of drive screw 16 will cause drive nut 37 and associated carriage 17 to axially translate relative to drive screw 16 via the interaction of drive screw 16 and threaded hole 39. As the elevation of carriage 17 is altered via the rotation of drive screw 16, the arcuate portions 70 of each caster 60 engages a respective arcuate guide channel 20, (A on FIG. 5). The engagement between arcuate portion 70 of caster 60 and respective guide channel 20 will cause caster 60 to rotate on needle bearing set 62 and between first and second bearing sets 63 and 64 about cam shaft 52. The frictional engagement between guide channel 20 and arcuate portion 70 of each caster 60 assures that carriage 17 remains accurately positioned on elongated post 15.

Should any play or movement exist between carriage 17 and elongated post 15, due to, for example, manufacturing inconsistencies such as that shown at B in FIG. 5, then in accordance with one of the main features of the invention, casters 60 may be adjusted. Specifically, hex nut 45 is loosened, and cam bolt 46 is rotated thereon. Given that threaded hole 48 is offset from centerline 47 of cam bolt 46, rotation of cam bolt 46 will axially translate caster 60 in a direction transverse to the longitudinal axis of elongated post 15, and toward and away from respective guide channel 20 (FIG. 7). As such, cam bolt 46 may be rotated to axially translate caster 60 toward or away from guide channel 20 to assure that there is sufficient frictional engagement between each caster 60 and guide channel 20 that caster 60 will rotate about cam shaft 52. Further, this frictional engagement will not only ensure smooth translation of carriage 17 along elongated post 15, such adjustment will also assure that no movement or play exists between elongated post 15 and carriage 17. Once cam bolt 46 has been rotated such that associated caster 60 is accurately positioned relative to a respective guide channel 20, for example, from position B to position A shown in FIG. 5, hex nut 45 can be tightened into threaded hole 48 to lock the position of cam bolt 46. As should be apparent to one of ordinary skill in the art, hoist apparatus 1 may provide adjustable caster 60 on only one side of carriage plate 35, with caster 60 on the other side of carriage plate 35 merely being rotatably mounted on a shaft, rather than on a cam shaft as described hereinabove, without departing from the spirit of the present invention.

Once an appropriate elevation has been selected in the manner described above, the frictional engagement of caster 60 and of corresponding guide channel 20 will be sufficient to maintain the correct elevation. However, if an elevation is chosen, and will be so positioned for an extended period of time, the height of carriage 2 may be secured. To secure carriage 17 at a predetermined height, hex nut 45 is loosened, and cam bolt 46 is rotated so as to actually translate associated caster 60 in a direction transverse to the longitudinal axis of elongated post 15 such that the frictional engagement between caster 60 and guide channel 20 is significantly increased. Hex nut 45 is then retightened, and carriage 17 is essentially locked at the predetermined elevation.

Referring specifically to FIG. 7, the extreme positions of caster 60 are shown with the innermost position being shown in solid line, and the outermost position being shown in dot-dash lines, any position between which the caster may be moved via rotation of cam bolt 46.

A second embodiment of the present invention is shown in FIGS. 8–11, and is indicated generally at 80 therein. Similar to hoist apparatus 1, hoist apparatus 80 includes an elongated post 15, a carriage 17 and a hand crank 18. Similarly, carriage 17 includes flanges 36, and elongated post 15 includes a pair of guide channels 20 formed thereon.

Figure 10:
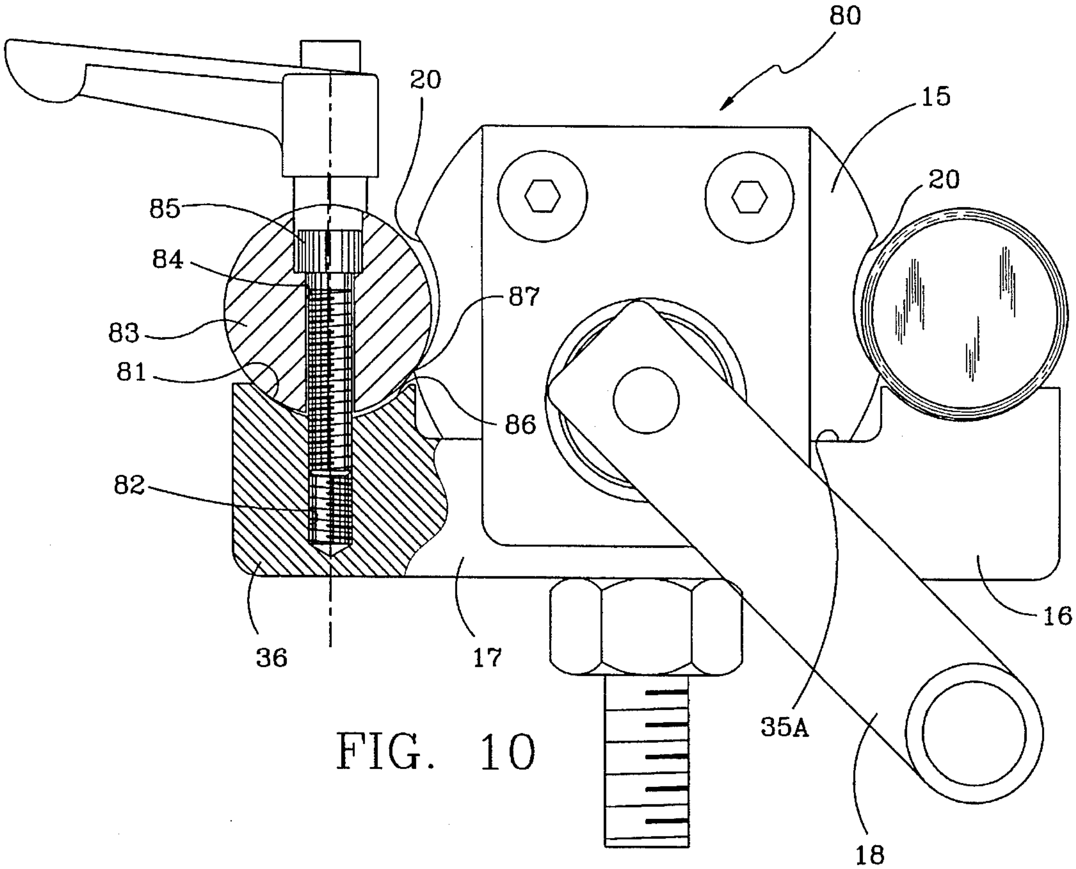
FIG. 10 is an enlarged top plan view of the upper portion of the second embodiment of the invention, with portions cut away and in section.

Referring only to the differences between hoist apparatus 1 and hoist apparatus 80, flanges 36 are formed with an arcuate concave recess 81 and a pair of threaded holes 82 (FIG. 10). A cylindrical friction guide 83, having a through aperture 84 is partially accepted in recess 81. A hex bolt 85 extends through each aperture 84 and into a respective threaded hole 82 to secure friction guide 83 partially within recess 81.

While friction guide 83 and recess 81 are complementarily shaped, only a portion of friction guide 83 contacts recess 81 at an outer portion 85 creating a space 86 extending between friction guide 83 and recess 81. Friction guide 83 also contacts an inner corner 87 of guide channel 20. It is this contact, between friction guide 83 and inner corner 87 of guide channel 20 which prevents friction guide 83 from fully seating within recess 81.

Figure 11:
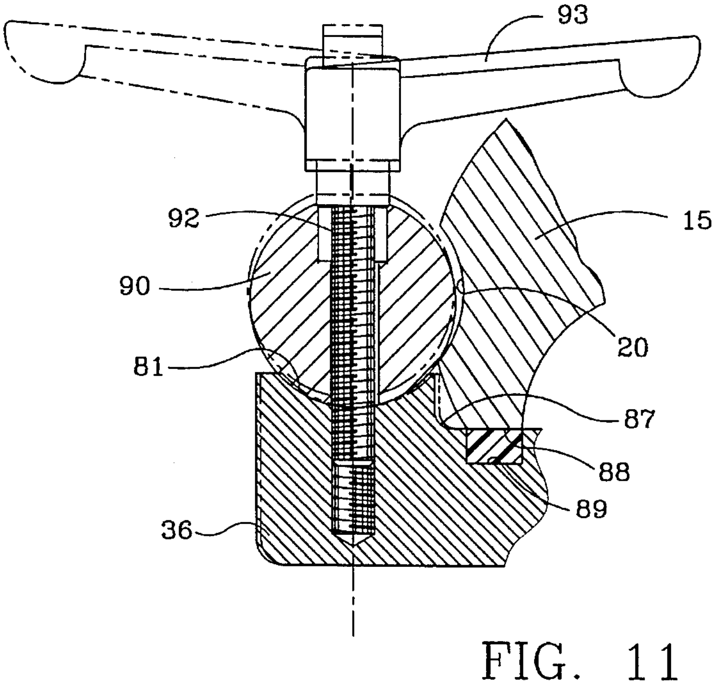
FIG. 11 is an enlarged fragmentary sectional view taken substantially along line 11—11, FIG. 8, with portions cut away, and showing the device in an unlocked position in dot-dash lines, and in a locked position in solid lines.

Further, rear surface 35A of carriage plate 35 frictionally engages a front surface 88 of post 15. In the preferred embodiment, rear surface 35A of carriage plate 35, adjacent post 15, includes a number of recesses for housing a plurality of wear bars 89 (FIG. 11). Wear bars 89 are preferably replaceable, and may be manufactured from a variety of synthetic materials, such as nylon. As such, carriage 17 is retained in position on post 15 via the frictional engagement between friction guide 83 and recess 81, friction guide 83 and guide channel 20, and carriage plate 35 and surface 88 of post 15. Carriage 17 thus remains accurately positioned on elongated post 15.

Figure 8:
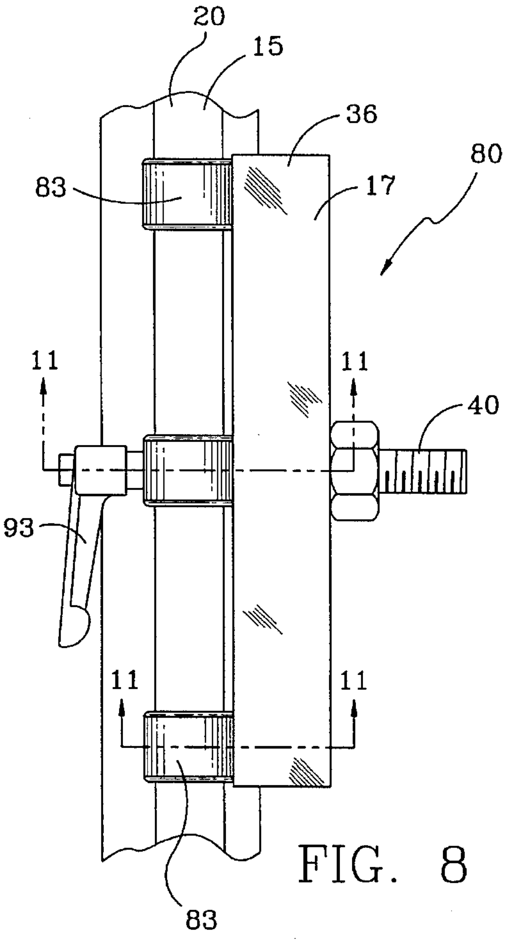
FIG. 8 is a fragmentary side elevational view of an upper portion of a second embodiment of the invention.
Figure 9:
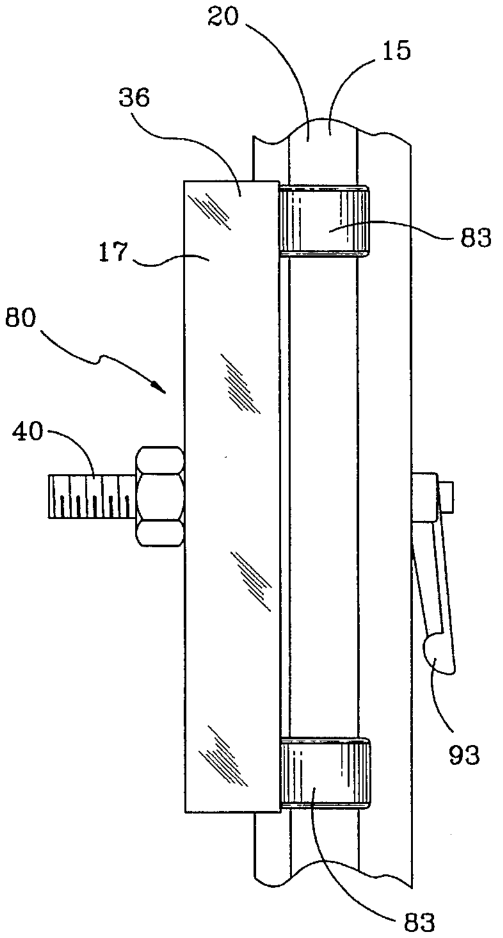
FIG. 9 is a fragmentary opposite side elevational view of an upper portion of the second embodiment of the invention.

A locking friction guide 90, identical to friction guide 83, is carried by one flange 36. In the preferred embodiment, locking friction guide 90 is interposed between the friction guides 83 carried by one flange 36 (FIG. 8). Referring specifically to FIG. 11, an aperture 91 extends partially through flange 36 for accepting a hex bolt 92 having a handle 93 attached thereto. The relationship of locking friction guide 90 with recess 81, and post 15 is identical to the relationship of friction guide 83 and recess 81 and post 15.

In operation, the rotation of handle 18 rotates drive screw 16 in a manner identical to that described in the first embodiment. Similarly, rotation of handle 18 causing rotation of drive screw 16, axially translates carriage 17 relative to elongated post 15.

However, as carriage 17 is axially translated on elongated post 15, friction guides 83 merely frictionally engage guide channel 20 at an inner corner 87. Similarly, wear blocks 89 engage front surface 88 of elongated post 15. This frictional engagement, in combination with sliding contact between recess 81 and friction guide 83, assures that carriage 17 remains accurately positioned on elongated post 15.

Once a predetermined height for carriage 17 is determined, crank 18 is rotated until such elevation is achieved. Thereafter, handle 93 is rotated from the position shown in dot-dash lines in FIG. 11 to the position shown in solid lines. Rotation of handle 93 moves locking friction guide 90, significantly increasing the frictional engagement between locking friction guide 90 and recess 81, as well as the frictional engagement between locking guide 90 and guide channel 20. Further, as hex bolt 92 is tightened, wear plate 89 will be drawn tightly against front surface 88 of elongated post 15 locking carriage 17 on elongated post 15.

Moreover, as shown in FIGS. 10 and 11, as locking friction guide 90 is tightened against recess 81 and guide channel 20, the friction guides 83 on either side of locking friction guide 90 will no longer engage guide channel 20 as all forces acting on the friction guides 83 on either side of locking friction guide 90 are translated to locking friction guide 90, locking friction guide 90 thus cooperates with friction guides 83 engaging the opposite guide channel 20 to create a three-point lock. Further, when locking friction guide 90 is tightened, carriage 17 is translated in a direction transverse to the longitudinal axis of elongated post 15 from the position shown in dot-dash lines to the position shown in solid lines in FIG. 11.

As should be apparent to one of ordinary skill in the art, the number of wear blocks 89 may be varied depending upon the particular uses of the invention. However, in the preferred embodiment, six wear blocks are provided, such that two are positioned above bolt 40, and four are positioned below bolt 40, as significantly more load is carried by the lower portion of carriage 17 than the upper portion of carriage 17.

It should also be apparent to one of ordinary skill in the art, both carriage plate 35 and elongated post 15 may be extruded of aluminum to reduce manufacturing cost without departing from the spirit of the present invention. Further, it should also be apparent that tolerances of the respective parts of the hoist apparatus 1 may be significantly relaxed as the casters of the first embodiment of the invention, and the friction guides of the second embodiment of the invention may be adjusted to assure that no movement exists between carriage 17 and the post 15.

In summary, it can be readily understood that in using the hoist apparatus 1 of the present invention, a machine may be accurately positioned relative to a production line, such that the accurate position may be maintained indefinitely. Moreover, the present invention provides the above while maintaining relaxed manufacturing tolerances.

Accordingly, the first apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hoist apparatus is constructed and used, the characteristics of the construction, and the advantageous, new and useful results obtained; the new and useful structures, devices, elements, arrangements, parts and combinations, are set forth in the appended claims.

I claim:

1. A hoist apparatus for lifting, supporting and positioning a load comprising:

an elongated post having a pair of sides with arcuate guide channels formed thereon and a front surface having a recess formed thereon;

base means for supporting the post in an upright position;

a drive screw extending within said recess in said front surface;

carriage means for supporting a load, which carriage means operatively communicates with said drive screw;

follower means engaging each respective arcuate guide channel for movement of the carriage means thereal-ong;

said follower means being carried by said carriage means; and adjusting means for adjusting the follower means toward and away from a respective arcuate guide channel to remove any movement therebetween.

2. The hoist apparatus as defined in claim 1 in which a drive nut is attached to said carriage means; and in which said drive nut includes a threaded hole for engaging the drive screw such that rotation of the drive screw will linearly translate the drive nut, and attached carriage means relative to the base means.

3. The hoist apparatus as defined in claim 1 in which the follower means includes at least one caster operatively engaging each guide channel, and in which each caster is supported on a bolt attached to said carriage means.

4. The hoist apparatus as defined in claim 3 in which each caster is rotatably supported on said bolt such that as the carriage is linearly translated via rotation of the drive screw, said caster will contact the respective guide channel causing it to rotate about the bolt.

5. The hoist apparatus as defined in claim 4 in which a plurality of needle bearings are interposed between each caster and respective bolt.

6. The hoist apparatus as defined in claim 5 in which the bolt includes an enlarged bolt head and in which a first bearing set is interposed between the caster and said enlarged bolt head; and in which a second bearing set is interposed between the caster and the carriage means for providing caster rotation relative to the guide channel.

7. The hoist apparatus as defined in claim 3 in which each caster includes at least one portion complementary shaped with respect to a portion of the guide channel such that a surface contact is created therebetween.

8. The hoist apparatus as defined in claim 7 in which each caster includes two spaced apart portions, each spaced apart portion being complementary shaped to a corresponding portion of said guide channel, and in which a third portion is positioned intermediate said two spaced apart portions such that it does not contact said guide channel.

9. The hoist apparatus as defined in claim 3 in which there are two casters operatively engaging each guide channel.

10. The hoist apparatus as defined in claim 3 in which each bolt has an axial centerline and is formed with a hole having a central axis parallel to, but spaced apart from said axial centerline; and in which a pin extends through said carriage and into said hole such that rotation of said bolt on said pin will move the caster linearly in a direction transverse to the axial centerline of the bolt.

11. The hoist apparatus as defined in claim 10 in which said bolt includes a threaded hole, and in which the threaded hole threadably engages the pin such that the bolt may be positioned with the caster a preselected distance from said guide channel, and said pin will threadably engage said hole to lock said preselected distance.

12. The hoist apparatus as defined in claim 1 further comprising rotation means for imparting rotation on said drive screw.

13. The hoist apparatus as defined in claim 12 in which the rotation means for rotating the drive screw is a handle.

14. The hoist apparatus as defined in claim 12 in which the rotation means for rotating said drive screw is a motor.

15. The hoist apparatus as defined in claim 1 in which the base means includes a hollow support post; and in which the elongated post telescopically engages the support post.

16. The hoist apparatus as defined in claim 15 in which the support post has an interior cross-section complementary shaped to the exterior of said elongated post.

17. The hoist apparatus as defined in claim 12 in which the rotation means further includes a bearing set, and in which the drive screw is rotatably mounted on said bearing set.

18. The hoist apparatus as defined in claim 1 in which the carriage means includes a pair of flanges, and in which each flange includes an exterior surface extending along the length thereof.

19. The hoist apparatus as defined in claim 18 in which the follower means includes at least one friction guide at least partially frictionally engaging each exterior surface, and in which at least one of said friction guides extends at least partially into each of said guide channels.

20. The hoist apparatus as defined in claim 18 in which each exterior surface is formed with an arcuate recess extending along the length thereof; and in which the follower means includes that at least one frictional guide extending at least partially into each recess, and in which at least one friction guide extends partially into each of said guide channels.

21. The hoist apparatus as defined in claim 20 in which the friction guide is a cylindrical-shaped member.

22. The hoist apparatus as defined in claim 20 in which the carriage means includes a rear surface, and in which the rear surface frictionally engages the elongated post.

23. A hoist apparatus for lifting, supporting and positioning a load comprising:

an elongated post having a pair of sides with arcuate guide channels formed thereon and a front surface having a recess formed thereon;

base means for supporting the post in an upright position;

a drive screw extending within said recess in said front surface;

carriage means for supporting a load, which carriage means operatively communicates with said drive screw and includes a pair of flanges each including an exterior surface extending along the length thereof and being formed with an arcuate recess formed in said exterior surface;

a rear surface formed on the carriage means whereby the rear surface frictionally engages the elongated post;

a plurality of apertures formed in the rear surface of the carriage means;

a wear plate received within each of said apertures for frictionally engaging the elongated post;

follower means engaging each respective arcuate guide channel for movement of the carriage means therealong including at least one frictional guide extending at least partially into each recess, and in which at least one frictional guide extends partially into each of said guide channels; and said follower means being carried by said carriage means.

24. The hoist apparatus as defined in claim 23 in which a locking friction guide is carried by the carriage means adjacent one of the guide channels.

25. The hoist apparatus as defined in claim 24 in which the locking friction guide is interposed between two friction guides; in which said carriage means includes a threaded aperture; in which said locking friction guide also includes an aperture; and in which a locking bolt extends through said aperture in said locking friction guide and threadably engages said aperture of said carriage means.

26. The hoist apparatus as defined in claim 25 in which a handle is attached to the bolt such that rotation of said handle will axially translate the bolt in and out of the threaded hole in said carriage means such that rotation of the handle in one direction will tighten said locking friction guide toward said recess and said guide channel, and in which rotation of the handle in another direction will axially translate said locking friction guide away from said recess.

27. A hoist apparatus for lifting, supporting and positioning a load comprising:

an integrally formed elongated post having a pair of sides with arcuate guide channels formed thereon and a front surface having a recess formed thereon;

base means for supporting the post in an upright position;

a drive screw extending within said recess in said front surface whereby the integrally formed post extends on opposite sides of the drive screw;

carriage means for supporting a load, which carriage means operatively communicates with said drive screw;

follower means engaging each respective arcuate guide channel for movement of the carriage means therealong; and said follower means being carried by said carriage means.

* * * * *